United States Patent [19]

Beekman

[11] 3,920,792

[45] Nov. 18, 1975

[54] STABLE ANTACID COMPOSITIONS BASED ON ALUMINUM HYDROXIDE AND CONTAINING HYDROXY MAGNESIUM AMINOACETATE AND PROCESS FOR PREPARING THE SAME

[76] Inventor: Stewart M. Beekman, P. O. Box 277, Signal Mountain, Tenn. 37377

[22] Filed: May 8, 1972

[21] Appl. No.: 251,062

[52] U.S. Cl. .................. 424/156; 424/157; 424/319
[51] Int. Cl.² .......................................... A61K 33/10
[58] Field of Search.................... 424/156, 157, 319

[56] References Cited
UNITED STATES PATENTS

| | | | |
|---|---|---|---|
| 2,880,136 | 3/1959 | Gore | 424/156 |
| 2,907,781 | 10/1959 | Hermelin | 424/325 X |
| 2,958,626 | 11/1960 | Schenck | 424/156 |
| 3,208,906 | 9/1965 | Beekman | 424/158 |
| 3,452,138 | 6/1969 | Granatek et al. | 424/157 |

*Primary Examiner*—Frederick E. Waddell

[57] ABSTRACT

Stable antacid compositions are provided based on aluminum hydroxide and containing hydroxy magnesium aminoacetate, which imparts excellent stability to the aluminum hydroxide.

A process for preparing such compositions is also provided, which comprises mixing the hydroxy magnesium aminoacetate with a highly reactive hydrous gelatinous aluminum hydroxide gel containing carbonate, and then drying the resulting mixture.

8 Claims, No Drawings

STABLE ANTACID COMPOSITIONS BASED ON ALUMINUM HYDROXIDE AND CONTAINING HYDROXY MAGNESIUM AMINOACETATE AND PROCESS FOR PREPARING THE SAME

Antacid preparations are now quite generally employed for the treatment of peptic ulcers, gastric hyperacidity, and dyspepsia. Gwilt, Livingstone and Robertson in the *Journal of Pharmacy and Pharmacology*, X 770–775 (1958), describe the characteristics of an ideal antacid. They point out that it should show its maximum neutralizing effect in the shortest possible time, that it should neutralize an adequate amount of gastric hydrochloric acid and maintain its action during the normal period of gastric digestion, that any excess however great beyond the amount required to neutralize free gastric acid should not cause alkalization, that it should raise the pH of the gastric contents to a level at which pepsin activity is reduced significantly but not totally inhibited, that adequate and repeated doses should be palatable to the hyperacid patient, and that its use should not lead to laxative, constipating or other side effects such as gastric irritation. In addition to these factors, which are of primary importance, the antacid composition should be inexpensive, and it should not deteriorate significantly in any respect upon ageing. These workers summarize the various statements in the literature as to the pH ranges desirable for the ideal antacid, and conclude that a pH within the range from about 3.5 to about 4.5 is apparently the optimum, to ensure adequate relief from hyperacidity, particularly if an ulcer site is present, and at the same time permit sufficient residual pepsin activity to avoid secondary digestive disturbances.

Edwards in *The Chemist and Druggist*, December 14, 1957, page 647, also discusses the properties of an ideal antacid, and suggests that the nearest approach to the ideal attained as of that date was wet activated alumina gel. Dr. Edwards' views of the properties of the ideal antacid are in substantial agreement with those expressed by Gwilt et al.

Liquid aluminum hydroxide gel closely approaches the ideal for an antacid, but its liquid form makes it inconvenient to use, especially in the case of ambulatory patients. The liquid gel is quite rapid in its action, and gives a prolonged antacid effect in the optimum pH range. It is not significantly affected in its antacid properties by pepsin, and it also does not significantly lose its antacid characteristics upon ageing. However, as Edwards and others have pointed out, it may have a mildly constipating effect, which may have sought to remedy by combining it with other ingredients, such as magnesium hydroxide or carbonate.

The dried aluminum hydroxide gel avoids the disadvantages of the liquid material, but, actually, the dried gel is far from an ideal antacid. It exhibits a lag in its rate of reaction with stomach acid. It does not give a prolonged antacid activity in the optimum pH range, and its antacid properties are severely affected by pepsin. Also, its antacid activity is less than that of the liquid gel, being decreased by the drying, and the reduced activity decreases further upon ageing. These disadvantages have been noted by Gwilt et al. and other workers in this field.

Rossett and Flexner, *Annals of Internal Medicine*, 21 119 (1944) reported that mixtures of milk of magnesia (magnesium hydroxide) with aluminum hydroxide gel were more effective gastric antacids than aluminum hydroxide alone. These conclusions were based on in vivo experiments on humans, together with extensive clinical experience.

Rossett and Rice, *Gastroenterology*, 26 490 (1954), Morrison, *Am, J. Gastroenterology*, 21 301 (1954), and Jankelson, *Am. J. Dig. Dis.*, 14 11 (1947) reported that liquid aluminum magnesium hydroxide gels were effective for the treatment of peptic ulcer, hyperacidity, heartburn, spasticity, and gastritis. However, simple mixtures of aluminum hydroxide and magnesium hydroxide dried gels have the disadvantage that they result in a high undesirable initial rise in pH, and they also show a rapid diminution in antacid activity on ageing. This property is characteristic also of aluminum hydroxide dried gels.

Krantz and Kibler U.S. Pat. No. 2,480,743, granted Aug. 30, 1949, prepared aluminum dihydroxy aminoacetate, which has been a highly successful antacid, used with magnesium carbonate to buffer aspirin in a well-known commercial product. Dihydroxy aluminum aminoacetate does not exhibit the loss of activity of ordinary dried aluminum hydroxide with ageing. Dihydroxy aluminum aminoacetate does, however, produce constipation, when administered in large doses, in the manner of aluminum hydroxide.

Hermel in, U.S. Pat. No. 2,907,781, granted on Oct. 6, 1959, suggested the use of a monohydroxy monomagnesium quadrialuminum salt of aminoacetate acid, and showed a method for its preparation. Its Al:Mg atomic ratio was 4:1, which is outside the range found best for peptic ulcer therapy. Moreover, the method required for its preparation is very complex and expensive. One of the reactions is carried out in anhydrous dimethyl formamide solution, with magnesium dimethyl as a source of magnesium, a far more costly compound than magnesium itself. Neither the product nor the process has achieved commercial success.

In accordance with the present invention, an antacid composition is provided based on aluminum hydroxide and containing hydroxy magnesium aminoacetate. This composition contains therapeutically desirable ratios of aluminum and magnesium, and rapidly increases the pH level of gastric juice to within the optimum pH range of 2.5 to 5, and maintains the pH level within the desirable range for a considerable period of time. Moreover, it readily reacts with additional gastric juice as it is formed. The compositions of the invention are very stable, either in the wet undried state, or when reduced to powdered form.

In this respect, the compositions of the invention are more efficient antacids and more palatable to the taste and less chalky than previous combinations developed previously, containing co-dried gelatinous aluminum hydroxide and gelatinous magnesium compounds, such as magnesium hydroxide, magnesium carbonate and magnesium trisilicate. These compositions are disclosed in U.S. Pat. Nos. 3,208,906, dated Sept. 28, 1965, and 3,272,704, dated Sept. 13, 1966, to Stewart M. Beekman. The compositions are stabilized by adding a hexitol or glycine to the mixed gelatinous gels before drying.

The antacid compositions of the invention are prepared by blending highly reactive hydrous gelatinous aluminum hydroxide gel containing carbonate with hydroxy magnesium aminoacetate and then drying the resulting mixture. The resulting compositions are stable, and have been stored for as much as 12 months at room-temperature without significant diminution in antacid effectiveness. This high stability is obtained without the addition of glycine, or hexitol, or other excipients.

The aluminum hydroxide hydroxy magnesium aminoacetate antacid compositions in accordance with the invention approach the theoretical requirements for an ideal antacid in dried form, because they are capable of rapidly increasing the pH of gastric juice to within the range from about 2.5 to 5, and of maintaining the pH within this range for very long periods of time, of the order of two hours or more. They do not display the high initial pH rise characteristic of hydroxy magnesium aminoacetate, taken alone, nor do they display the constipating effect which is characteristic of aluminum hydroxide. They are non-systemic, and do not upset the acid base balance of the blood. They are not adversely affected by pepsin in antacid action. They are non-irritating to the gastrointestinal tract. They have a desirable, very mild, astringent effect, with a minimal constipating or laxative effect. They have excellent coating characteristics for inflamed membranes, providing protection from highly acid corrosive gastric fluid.

The antacid compositions of the invention can be referred to as a co-dried gel, because the aluminum hydroxide is initially in gel form, and is co-dried with the hydroxy magnesium aminoacetate. However, the magnesium compound may or may not be in gel form. The undried or gel form may be more readily available, and can be employed. The dry powdered form can also be used, and is very effective.

The aluminum hydroxide on the other hand, must be in a highly reactive hydrous gelatinous form, containing carbonate. The carbonate is introduced into the gel by precipitating the gel in the presence of carbonate ion. The carbonate can be supplied as carbonic acid or as a carbonate salt, such as an alkali metal carbonate, such as sodium carbonate. In a typical preparatory procedure, a water-soluble aluminum salt, such as aluminum chloride, is reacted with sodium carbonate to form aluminum hydroxide gel. The precipitation can be carried out at room temperature. The precipitated aluminum hydroxide gel is recovered by filtration or by centrifuging, and is blended in wet form with the hydroxy magnesium aminoacetate.

The drying of the blend can be carried out by any convenient drying method, such as tray-drying, flash-drying, or spray-drying. Spray-drying produces a free-flowing powder, which does not require pulverizing, and is preferred.

The proportions of aluminum hydroxide and hydroxy magnesium aminoacetate in the co-dried gel are important in developing and maintaining a fast antacid action within the pH range from about 2.5 to about 5. The molecular ratio Al:Mg should be within the range from about 4:1 to about 0.5:1. Proportions of aluminum hydroxide to give an Al:Mg ratio in excess of 4:1 can be used without disadvantageously affecting pH, but with the detriment that the composition is greatly slowed in its antacid action, so that the desired pH is not reached until a considerable time following administration, which is undesirable. The proportion of magnesium content can exceed the Al:Mg ratio of 0.5:1, but when it does, the maximum pH which follows administration of the composition may rise to considerably in excess of 5, which, again is undesirable. Thus, the stated ratio represents the optimum proportions of aluminum and magnesium for effective and prompt antacid action.

Antacid compositions selected for use in peptic ulcer therapy generally have Al:Mg ratios within the range from 2:1 to 1.2. Antacids intended for use in the relief of heartburn and other local symptoms of the gastrointestinal tract may have Al:Mg ratios of 4:1.

Excipients such as sucrose, dextrose, lactose, starch, glycine, hexitols such as mannitol and sorbitol, fructose, invert sugar, cellulose, and the like may conveniently be blended with the aluminum hydroxide hydroxy magnesium aminoacetate composition prior to drying. Such excipients usually would be added in an amount within the range from about 2 to about 200 percent by weight of the antacid composition, preferably within the range from about 20 to about 50 percent.

Other antacids also can be blended with the compositions of the invention, either before or after drying, to achieve a modified antacid activity. Such antacids include calcium carbonate, magnesium carbonate, magnesium hydroxide, magnesium trisilicate, aluminum dihydroxy aminoacetate, dihydroxy aluminum sodium carbonate, magnesium aluminate, sulfated magnesium aluminate, aluminum phosphate, and others.

The antacid activity of the aluminum hydroxidehydroxy magnesium aminoacetate antacid compositions of the invention is evaluated by the Beekman modification of the Holbert, Noble and Grote Test Method, *Journal of the American Pharmaceutical Association*, Scientific Edition, 49 191 (1960). In addition to high antacid activity, the antacid compositions of the invention have shown a high order of antiproteolytic activity. Antiproteolytic activity is evaluated by the Beekman modification of the Schaub method. The latter is a combination of the dynamic Johnson and Duncan antacid method, with the Bateson modification of the method used by West, Ellis and Scott for the rapid estimation of uropepsin.

The combination of antacid activity with proteolytic activity is especially desirable. Many investigators, including Buchs, Borey and Yanari; Norpoth et al; Schlamowitz and Peterson; Merten and Ratzer; Persson and Bunke and Bergman; Persson and Westling, have demonstrated that some cathepsin activity takes place in the pH range of 1.5 to 4.5, and therefore a satisfactory antacid should not only rapidly neutralize acid in the pH range of 2.5 to 5, but should also inhibit proteolytic enzymes in the pH range of 1 to 5.

The antacid compositions can be readily formulated as dry-dosage forms or in aqueous suspensions having a high acid consuming activity per unit volume.

The following examples in the opinion of the inventors represent preferred embodiments of the invention. In these examples, antacid activity was evaluated by the Beekman modification of the Holbert, Noble and Grote method, and antiproteolytic activity by the Beekman modification of the Schaub method.

EXAMPLE A

Preparation of Reactive Aluminum Hydroxide Wet Gel containing carbonate 400 pounds of a highly reactive aluminum hydroxide gel was prepared by the following procedure: 125 lbs. of a 10% solution of sodium carbonate was reacted with 52 lbs. of a 20% aqueous solution of aluminum chloride and 223 lbs. of filtered tap water at 20°C. The mixture was then allowed to stand for 3 hours at room-temperature in a reaction vessel, a 56 gallon Fiberglass-reinforced plastic vessel which was fully baffled. During the reaction time, the contents of the vessel were stirred, using a single 8-inch diameter four-blade radial turbine at 160 rpm. The addition rates of the reactants were carefully controlled by pumping through a calibrated rotameters. The pH profile during the reaction was carefully controlled with pH electrodes immersed directly in the reaction mixture. The reaction product was an aluminum hydroxide slurry containing 1.0% aluminum as $Al_2O_3$.

After reaction was complete, the slurry was filtered through a plastic filter. A vacuum of about 25 inches was maintained, using a water-sealed Nash vacuum pump. The filter was an unwoven cellulosic filter cloth. A firm cake was produced, about 0.75 inch thick, on the filter cloth. The cake was washed free of sodium chloride by three additions of 20 gallons of filtered room-temperature tap water, containing 10 ppm of residual chlorine as a bacteriostat.

The yield of filter cake was 49 lbs. The cake contained 8.1% aluminum as $Al_2O_3$, 3.4% carbonate as $CO_2$, 0.1% chloride and 0.08% sodium.

800 grams of a 4% $Al_2O_3$ suspension was prepared in a Waring Blendor, using 395 grams of this filter cake and 405 ml. of water. The aluminum hydroxide gel of U. S. P. strength had a pH value of 6.4. It was found to consume 24.5 volumes of 0.1 N HCl per volume of gel.

Using the Holbert, Noble and Grote in vitro test, the following results were obtained for a 5 ml. and a 10 ml. dose of this composition.

| Time minutes | pH 5 ml. dose | pH 10 ml. dose |
| --- | --- | --- |
| 0 | 1.7 | 1.7 |
| 1 | 2.7 | 4.0 |
| 2 | 3.9 | 4.0 |
| 3 | 4.0 | 4.0 |
| 4 | 4.0 | 4.0 |
| 5 | 4.0 | 4.1 |
| 10 | 4.0 | 4.1 |
| 20 | 4.0 | 4.1 |
| 30 | 4.0 | 4.1 |
| 40 | 4.0 | 4.1 |
| 50 | 4.0 | 4.1 |
| 60 | 3.9 | 4.1 |
| 70 | 3.7 | 4.1 |
| 80 | 3.2 | 4.1 |
| 90 | 2.7 | 4.0 |
| 100 | 2.5 | 3.9 |
| 110 | 2.3 | 3.8 |
| 120 | 2.2 | 3.5 |
| 130 | 2.1 | 3.0 |

EXAMPLE B

The antacid activity of hydroxy magnesium aminoacetate powder was evaluated. Its acid consuming capacity was approximately 175 cc. of 0.1 N HCl per gram. When tested by the Holbert, Noble and Grote test procedure in a 1 gram sample, the following results were obtained:

| Time minutes | pH |
| --- | --- |
| 0 | |
| 1 | 7.33 |
| 2 | 7.90 |
| 3 | 8.08 |
| 4 | 8.21 |
| 5 | 8.30 |
| 10 | 8.71[1] |
| 15 | 8.83[1] |
| 30 | 8.71[1] |
| 60 | 8.52[1] |
| 90 | 8.20[1] |
| 120 | 7.80[1] |
| 150 | 7.43[1] |
| 180 | 6.96[1] |
| 210 | 2.80[1] |

[1]pH taken prior to addition of 25 ml. 0.1 N HCl.

The results show that this compound has a very rapid action in raising the pH of the stomach acid, but raised the pH to outside the desirable range of from 2.5 to 5, and maintained it outside the range for 180 minutes after administration. Thus, the antacid activity of this composition is obtained only with alkalization.

EXAMPLE I

Preparation of an Aluminum Hydroxide-Hydroxy Magnesium Aminoacetate Co-Dried Gel having an Al:Mg ratio of 2:1

4.17 lbs. of commercial hydroxy magnesium aminoacetate in finely-divided powdered form containing 36.3% magnesium as MgO and 48.1% glycine was thoroughly dispersed in a mixture of 10 lbs. of water and 47 lbs. of the reactive aluminum hydroxide gel containing 8.1% aluminum as $Al_2O_3$ of Example A. The mixture was subjected to high-shear stirring, using a Cowles Dissolver. The resulting slurry was spray-dried in a Bowen type pilot plant spray drier, using a two-fluid nozzle atomizing device and an air inlet temperature of 370°F and an air outlet temperature of 210°F. The spray rate was about 0.8 lbs. per minute. 11 lbs. of spray-dried gel was obtained. The finely-divided white powder, more than 90% of which was less than 325 mesh, had the following composition:

| | |
| --- | --- |
| Aluminum as $Al_2O_3$ | 34.2% |
| Magnesium as MgO | 13.7% |
| Glycine | 18.0% |
| Acid-consuming capacity | 268 ml. of 0.1 N HCl per gram |
| Apparent density | 0.42 gram per ml. |

The white, odorless, dense free-flowing powder was evaluated for antacid activity on the basis of a 1-gram sample, using the Holbert, Noble and Grote test method, with the following results:

| Time minutes | pH |
| --- | --- |
| 0 | 1.7 |
| 0.25 | 3.1 |
| 0.50 | 4.0 |
| 1 | 4.3 |
| 5 | 5.0 |
| 10 | 5.0 |
| 20 | 5.2 |
| 30 | 5.1 |
| 40 | 4.9 |
| 50 | 4.7 |
| 60 | 4.6 |
| 70 | 4.5 |
| 80 | 4.4 |
| 90 | 4.4 |
| 100 | 4.3 |
| 110 | 4.2 |
| 120 | 4.0 |
| 130 | 3.6 |
| 140 | 3.2 |
| 150 | 2.9 |
| 160 | 2.6 |
| 170 | 2.5 |

The time to pH 3.0 was 13 seconds.
The time above pH 3 was 140 minutes.
The time above pH 2.5 was 170 minutes.

EXAMPLE 2

Preparation of an Aluminum Hydroxide-Hydroxy Magnesium Aminoacetate Co-Dried Gel Al:Mg 1:1

47.5 lbs. of reactive aluminum hydroxide gel, containing 8.0% aluminum as $Al_2O_3$, prepared as described in Example A, was thoroughly mixed with 10 lbs. water and 8.34 lbs. hydroxy magnesium aminoacetate containing 36.3% magnesium as MgO and 48.1% glycine. The resulting slurry was subjected to intense high shear mixing, using a Cowles Dissolver.

The mixed slurry was then spray-dried, using an air inlet temperature of 370°F and an air outlet temperature of 210°F. The slurry was atomized using a two-fluid nozzle.

15 lbs. of finely divided dense white powder was recovered, having the following composition:

| | |
|---|---|
| Aluminum as $Al_2O_3$ | 25.2% |
| Magnesium as MgO | 16.3% |
| Glycine | 21.6% |
| Acid-consuming capacity | 228.5 ml. of 0.1 N HCl per gram |
| Apparent density | 0.43 gram per ml. |

The powder was tested for antacid activity on the basis of a one gram sample, using the modified Holbert, Noble and Grote procedure. The following data was obtained:

| Time minutes | pH |
|---|---|
| 0 | 1.7 |
| 0.25 | 3.8 |
| 0.5 | 4.1 |
| 1 | 4.3 |
| 5 | 5.2 |
| 10 | 5.5 |
| 20 | 5.1 |
| 30 | 5.1 |
| 40 | 5.1 |
| 50 | 4.9 |
| 60 | 4.7 |
| 70 | 4.7 |
| 80 | 4.6 |
| 90 | 4.5 |
| 100 | 4.3 |
| 110 | 4.2 |
| 120 | 4.0 |
| 130 | 3.8 |
| 140 | 3.0 |
| 150 | 2.8 |
| 160 | 2.6 |
| 163 | 2.5 |

Time to pH 3.0
8 seconds
Time above pH 3.0
137 minutes
Time above pH 2.5
163 minutes

EXAMPLE 3

Preparation of an Aluminum Hydroxide-Hydroxy Magnesium Aminoacetate Co-Dried Gel Al:Mg: 1:2

46 lbs. of reactive aluminum hydroxide gel was prepared as described in Example A. The aluminum content as $Al_2O_3$ was 8.2%. This was thoroughly mixed with 15 lbs. of water and 16.5 lbs. of hydroxy magnesium aminoacetate in finely divided powder form. The mixing was carried out using a Cowles high-shear mixer.

The mixed slurry was pumped to the co-current two-fluid nozzle of a Bowen type pilot plant spray dryer, with inlet air at 360,F and outlet air at 210,F. The feed rate was about 0.5 lb. per minute. 23 lbs. of white, dense free-flowing powder was recovered, having the following composition:

| | |
|---|---|
| Aluminum as $Al_2O_3$ | 16.3% |
| Magnesium as MgO | 25.6% |
| Glycine | 34.0% |
| Acid-consuming capacity | 222 ml. 0.1 N HCl per gram |
| Chlorides as Cl | 0.05% |
| Sodium as Na. | 0.08% |

The antacid characteristics were evaluated using the Holbert, Noble and Grote test method on the basis of a 1-gram sample, with the following results:

| Time minutes | pH |
|---|---|
| 0 | 1.7 |
| 0.25 | 3.2 |
| 0.50 | 3.4 |
| 1.0 | 4.0 |
| 5.0 | 6.0 |
| 10.0 | 6.1 |
| 20 | 5.1 |
| 30 | 5.2 |
| 40 | 5.2 |
| 50 | 5.0 |
| 60 | 4.9 |
| 70 | 4.8 |
| 80 | 4.7 |
| 90 | 4.5 |
| 100 | 4.1 |
| 110 | 3.8 |
| 120 | 3.5 |
| 130 | 3.1 |
| 140 | 2.8 |
| 150 | 2.7 |
| 160 | 2.5 |

The time to pH 3.0 was less than 1 second.
The time above pH 3.0 was 135 minutes.
The time above pH 2.5 was 163 minutes.

EXAMPLE 4

Preparation of Aluminum Hydroxide-Hydroxy Magnesium Aminoacetate Co-Dried Gel Al:Mg ratio 4:1

45 lbs. of aluminum hydroxide gel, prepared in accordance with Example A and containing 8.1% aluminum as $Al_2O_3$, was added to a 10 gallon stainless steel vessel and thoroughly mixed with 10 lbs. of water and 2.0 lbs. hydroxy magnesium aminoacetate powder. A high-shear Cowles Dissolver was used for the mixing.

The resulting slurry was spray-dried, using an air inlet temperature of 370°F and an air outlet temperature of 210°F. 7.05 lbs. of a white, dense free-flowing powder was recovered, which had the following composition:

| | |
|---|---|
| Aluminum as $Al_2O_3$ | 44.0% |
| Magnesium as MgO | 8.8% |
| Acid-consuming capacity | 301 ml. 0.1 N HCl. per gram |
| Glycine | 13.2% |
| Chlorides as Cl. | 0.1% |
| Sodium as Na. | 0.4 |

The antacid activity of the co-dried gel was evaluated using the Holbert, Noble and Grote test procedure on the basis of a 1-gram sample. The results obtained were as follows:

| Time minutes | pH |
| --- | --- |
| 0 | 1.7 |
| 0.25 | 3.8 |
| 0.50 | 4.4 |
| 1 | 4.5 |
| 5 | 4.7 |
| 10 | 4.8 |
| 20 | 4.7 |
| 30 | 4.6 |
| 40 | 4.6 |
| 50 | 4.5 |
| 60 | 4.5 |
| 70 | 4.5 |
| 80 | 4.5 |
| 90 | 4.4 |
| 100 | 4.4 |
| 110 | 4.4 |
| 120 | 4.4 |
| 130 | 4.3 |
| 140 | 4.2 |
| 150 | 3.9 |
| 160 | 3.4 |
| 170 | 3.1 |
| 180 | 2.9 |
| 190 | 2.7 |
| 200 | 2.5+ |
| 203 | 2.5 |

The time to pH 3.0 was 17 seconds.
The time above pH 3.0 was 174 minutes.

The time above pH 2.5 was 203 minutes.

EXAMPLE 5

Preparation of an Aluminum Hydroxide-Hydroxy Magnesium Aminoacetate-Magnesium Hydroxide Co-Dried Gel Al:Mg ratio 1:1.62

48 lbs. of aluminum hydroxide gel prepared as described in Example A and containing 7.9% aluminum as $Al_2O_3$ was thoroughly dispersed and mixed with 10 lbs. of tap water, 4.14 lbs. hydroxy magnesium aminoacetate powder, and 4.9 lbs. magnesium hydroxide powder. A high shear mixer was used. The resulting homogeneous slurry was spray dried, using a co-current two-fluid nozzle, operated at 100 psi air pressure. The inlet air temperature was 370°F and the outlet air temperature 210°F.

15.5 lbs. of a free-flowing dense, fine, white powder was recovered, having the following analysis:

| | |
| --- | --- |
| Aluminum as $Al_2O_3$ | 24% |
| Magnesium as MgO | 30.8% |
| Aluminum Hydroxide | 40.5% |
| Hydroxy Magnesium Aminoacetate | 26% |
| Magnesium Hydroxide | 33.5% |
| Chlorides | 0.1% |
| Acid consuming capacity | 292 ml. of 0.1 N HCl per gram |

Antacid activity of this composition as a one-gram sample was evaluated by the Holbert, Noble and Grote test procedure. The results obtained were as follows:

| Time minutes | pH |
| --- | --- |
| 0 | 1.7 |
| 0.23 | 3.2 |
| 0.50 | 4.1 |
| 1.0 | 4.3 |
| 5. | 5.0 |
| 10 | 5.6 |
| 20 | 5.1 |
| 30 | 5.1 |
| 40 | 5.0 |
| 50 | 4.8 |
| 60 | 4.7 |
| 70 | 4.7 |
| 80 | 4.6 |
| 90 | 4.5 |
| 100 | 4.3 |
| 110 | 4.4 |
| 120 | 4.3 |
| 130 | 4.2 |
| 140 | 3.9 |
| 150 | 3.5 |
| 160 | 3.1 |
| 170 | 2.8 |
| 180 | 2.6 |
| 190 | 2.5 |

Time to pH 3.0 was 10 seconds.
Time above pH 3.0 was 165 minutes.
Time above pH 2.5 was 190 minutes.

The results show that the composition was very prompt in reaching the desired pH range, and had prolonged activity within this range.

Having regard to the foregoing disclosure, the following is claimed as the inventive and patentable embodiment thereof:

1. An antacid composition having a high storage stability and capable of rapidly increasing the pH of gastric juice to within the range from about 2.5 to 5, and of maintaining the pH within this range for at least two hours, comprising a co-dried blend of a highly reactive hydrous gelatinous aluminum hydroxide gel containing carbonate with hydroxy magnesium aminoacetate in which the proportions of aluminum hydroxide and hydroxy magnesium aminoacetate provide a molecular ratio Al:Mg within the range from about 4:1 to about 0.5:1.

2. The antacid composition of claim 1, in which the hydroxy magnesium aminoacetate is in gel form.

3. The antacid composition of claim 1, in which the hydroxy magnesium aminoacetate is in dry particulate form.

4. The antacid composition of claim 1, in the form of an aqueous hydrous gel.

5. The antacid composition of claim 1, in dry powdered form.

6. The antacid composition of claim 1, including an excipient in an amount within the range from about 2 to about 200 percent by weight of the antacid composition.

7. The antacid composition of claim 1, including another antacid compound.

8. The antacid composition of claim 7, in which the other antacid is aluminum dihydroxy aminoacetate.

* * * * *